Sept. 6, 1960 H. M. CASTOE 2,951,601
COMBINATION TRUCK AND HOISTING BOOM
Filed June 27, 1958 2 Sheets-Sheet 1
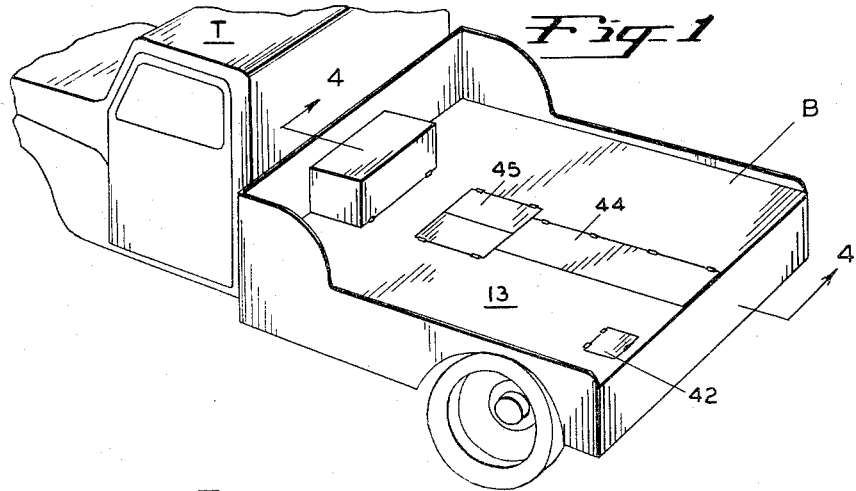
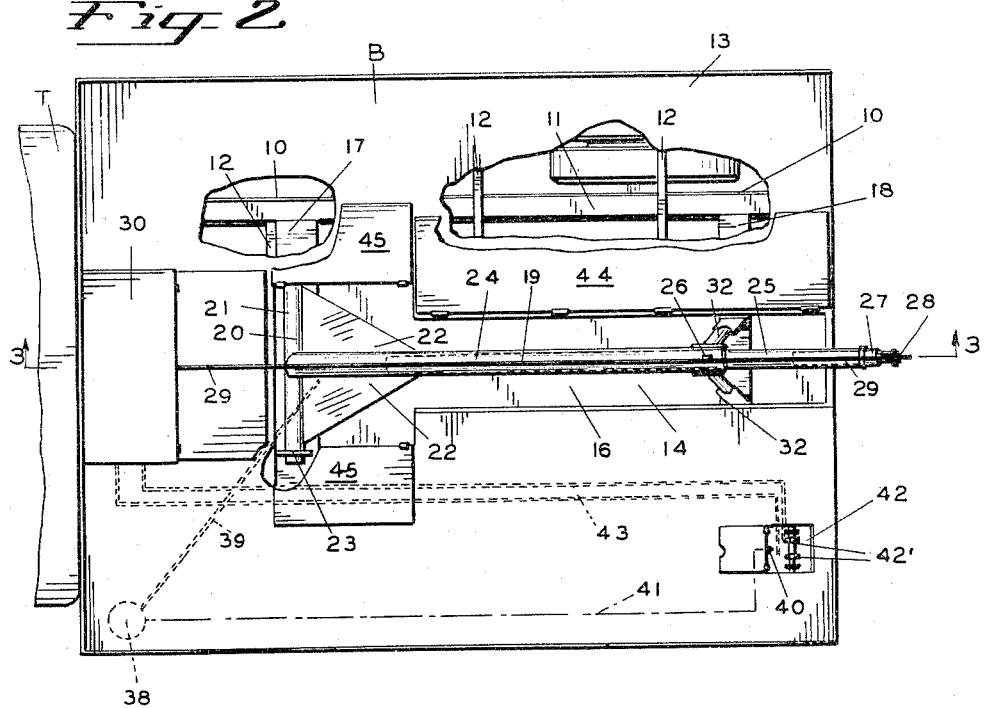
INVENTOR.
HUBERT M. CASTOE
BY
Kimmel & Crowell
ATTORNEYS Sept. 6, 1960   H. M. CASTOE   2,951,601
COMBINATION TRUCK AND HOISTING BOOM
Filed June 27, 1958   2 Sheets-Sheet 2
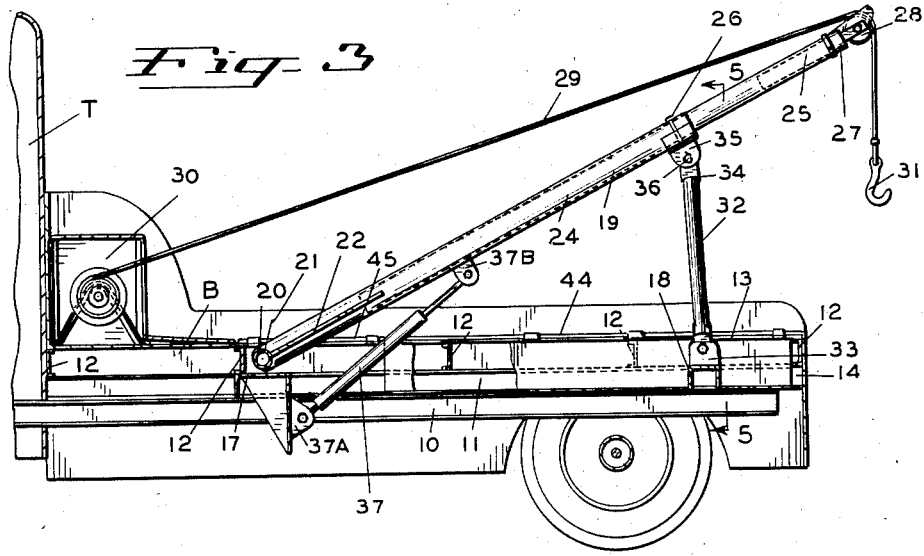
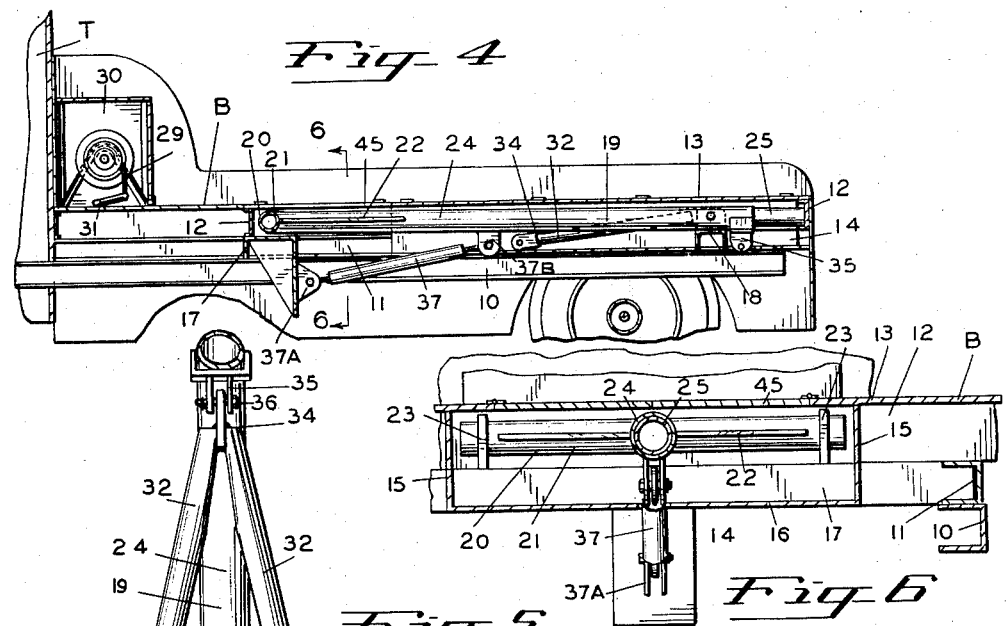
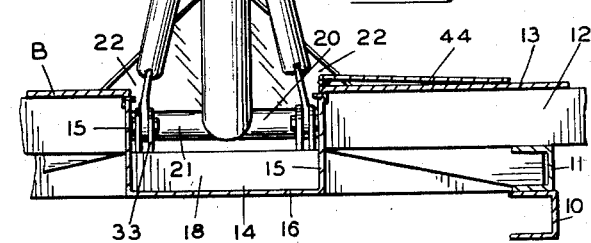
INVENTOR.
HUBERT M. CASTOE
BY
ATTORNEYS

2,951,601

COMBINATION TRUCK AND HOISTING BOOM

Hubert M. Castoe, Rte. 1, Box 223, Albany, Oreg.

Filed June 27, 1958, Ser. No. 745,115

1 Claim. (Cl. 214—86)

The present invention relates to a combination truck and hoisting boom which is particularly adapted for regular trucking purposes with the boom collapsed and capable of quick conversion into a tow truck by raising the hoisting boom associated therewith.

The primary object of the invention is to provide a truck that can be used as a flat bed truck and converted into a tow truck, having a hoisting boom thereon for towing and lifting of other vehicle.

Other objects and advantages will become apparent in the following specification when considered in the light of the attached drawings in which:

Figure 1 is a perspective view of the invention shown in use as a flat bed truck.

Figure 2 is a fragmentary plan view of the bed of the truck shown in use with the hoisting boom raised in operating position.

Figure 3 is a fragmentary sectional view, taken on line 3—3 of Figure 2, looking in the direction of the arrows.

Figure 4 is a fragmentary sectional view, taken on line 4—4 of Figure 1, looking in the direction of the arrows.

Figure 5 is a fragmentary sectional view, taken on line 5—5 of Figure 3, looking in the direction of the arrows.

Figure 6 is a fragmentary sectional view, taken on line 6—6 of Figure 4, looking in the direction of the arrows.

Referring now to the drawings in detail wherein like reference characters indicate like parts throughout the several figures, the reference character T indicates generally a truck constructed in accordance with the invention.

The truck T is of the type having a flat bed B. The main frame of the truck T is indicated by numeral 10. Mounted upon the main frame 10 of the truck T is a sub-frame 11, forming part of the bed B of the truck T. Transverse beams 12 rest on the sub-frame 11, while the actual floor 13 of the truck T is supported on the beams 12.

Located centrally of the floor 13 of the truck T is a well 14, including side walls 15 and a bottom 16. Cross beams 17 and 18 are fixedly secured to the sub-frame 11 within the bed B of the truck T by any suitable means, as for instance welding. Pivotally mounted within the well 14 is a boom 19.

The boom 19 has a transverse base 20 consisting of a tubular member 21 secured to the lower end of the boom 19 by welding and reenforced with gusset plates 22. The tubular member 21 is journalled in the upwardly extending ears 23, which form part of the cross member 17, as best illustrated in Figures 2 and 6.

The boom 19 includes a basic tubular member 24, having a smaller tubular member 25 slidably mounted therein and held in extended position by the locking pin 26, which passes through a hole in the upper end of the member 24 and through a hole located in the second member 25.

A third tubular member 27 is slidably mounted within the second member 25, and has a sheave 28 mounted on its outer end to receive the hoisting cable 29, as best illustrated in Figures 2 and 3. The hoisting cable 29 is operated from a hoisting assembly 30, which is fixed to the forward end of the bed B of the truck T, and is of a conventional design powered from the power take off of the truck, the power take off not here shown. The usual hook 31 is fixedly secured to the end of the cable 29 for lifting objects to be towed.

The boom assembly 19 is held in the raised position by supporting legs 32, whose lower ends are pivotally mounted to the cross beam 18 on upwardly extending ears 33. The upper end of the legs 32 converge and are secured together at 34 and are detachably secured to the ears 35 by a removable lock pin 36. The ears 35 are fixedly secured to the upper end of the tubular member 24.

The boom 19 is raised from the position shown in Figure 4 to that of Figure 3 by action of a fluid cylinder 37. This fluid cylinder 37 has one end pivotally mounted to the frame assembly 37A and has its piston rod pivotally secured to the ears 37B associated with the tubular member 24 at its upper end. The cylinder 37 receives its fluid from an electric pumping unit 38, referring to Figure 2, by way of the conduit 39. The electric pumping unit 38 is controlled by a push button switch 40 from the rear of the bed B of the truck T connected thereto by an electric conduit 41. The pumping unit 38 and the electric conduit 41 are indicated by broken lines.

The controls 42′ for operating the hoisting assembly 30 in both a forward and in reverse directions, are located within the well 42 adjacent to the push button switch 40, as best illustrated in Figures 1 and 2. The broken lines 43 illustrate the control conduits leading to the hoisting unit 30.

The well 14 for housing the hoisting boom assembly 19 has cover plates 44 and 45, hingedly mounted thereover, providing a smooth deck 13 for use of the truck T for hauling purposes.

In the mode of operation of this new and improved combination truck and hoisting boom, the operator opens the lid of the well 42 by hand and presses the electric push button 40. This applies a fluid to the end of the piston within the cylinder 37, raising the boom 19 upwardly, forcing the cover plates 44 and 45 to open position. The operator then raises the supporting legs 32 to the position shown in Figure 3, placing the removable lock pin 36 through the upper end thereof and through the ears 35. He then grasps the upper end of the member 25, pulls the same to the position shown in Figure 3, dropping the lock pin 26 into holes which register, and are not here shown, supporting this member 25 in this fixed position.

The third member 27 is next placed within the upper end of the member 25 and the operator reaches over and takes hold of the hook 31 located within the hoisting unit 30 and at the same time operates the controls 42′ so that the cable 29 can be brought up and over the pulley 28. The hoisting boom then is ready to do the job of towing a vehicle or the like, behind the truck T in the usual manner.

When the boom assembly is in the position shown in Figure 4, the member 27 and the locking pins 26 and 36 may be stored within the well 14.

Having thus described the preferred embodiment of the invention, it should be understood that numerous modifications and adaptations may be resorted to without departing from the scope of the appended claim.

What is claimed is:

A combination truck and hoisting boom therefor comprising a horizontal frame, a horizontal floor supported on said frame, a well fixed to said frame and said floor and depending from said floor, covers hingedly secured to said floor and arranged to close said well with said covers in the plane of said floor when in closed position, a boom, means extending transversely of the forward end of said well pivotally securing the forward end of said boom to said frame within said well, power means mounted on said frame for lifting the rear end of said boom upwardly to operative position from said well, a pair of legs having their lower ends pivotally secured to said frame in the rear end of said well for supporting the rear end of said boom when in raised position, said well and covers completely enclosing said boom and said legs in lowered position, means for controlling the power means for raising said boom, a hoisting assembly secured to said floor forwardly of said well, second power means independent of said first-mentioned power means co-operating with said hoisting assembly for raising a car with said boom, said boom including a plurality of telescopically adjustable tubular members, means releasably locking said tubular members in extended position, a second well beneath said floor at the rear end and adjacent one side thereof, control means for said hoisting assembly in said second well, and a closure for said second well flush with said floor when in closed position.

References Cited in the file of this patent

UNITED STATES PATENTS

| | | |
|---|---|---|
| 2,145,378 | Trippensee | Jan. 31, 1939 |
| 2,264,569 | Holmes | Dec. 2, 1941 |
| 2,644,595 | Levan | July 7, 1953 |
| 2,913,131 | Holmes | Nov. 17, 1959 |